May 10, 1927.  1,628,008
T. L. TALIAFERRO
APPARATUS FOR FORMING SEALING RINGS ON JAR CLOSURES OR THE LIKE
Filed May 7, 1924  2 Sheets-Sheet 2
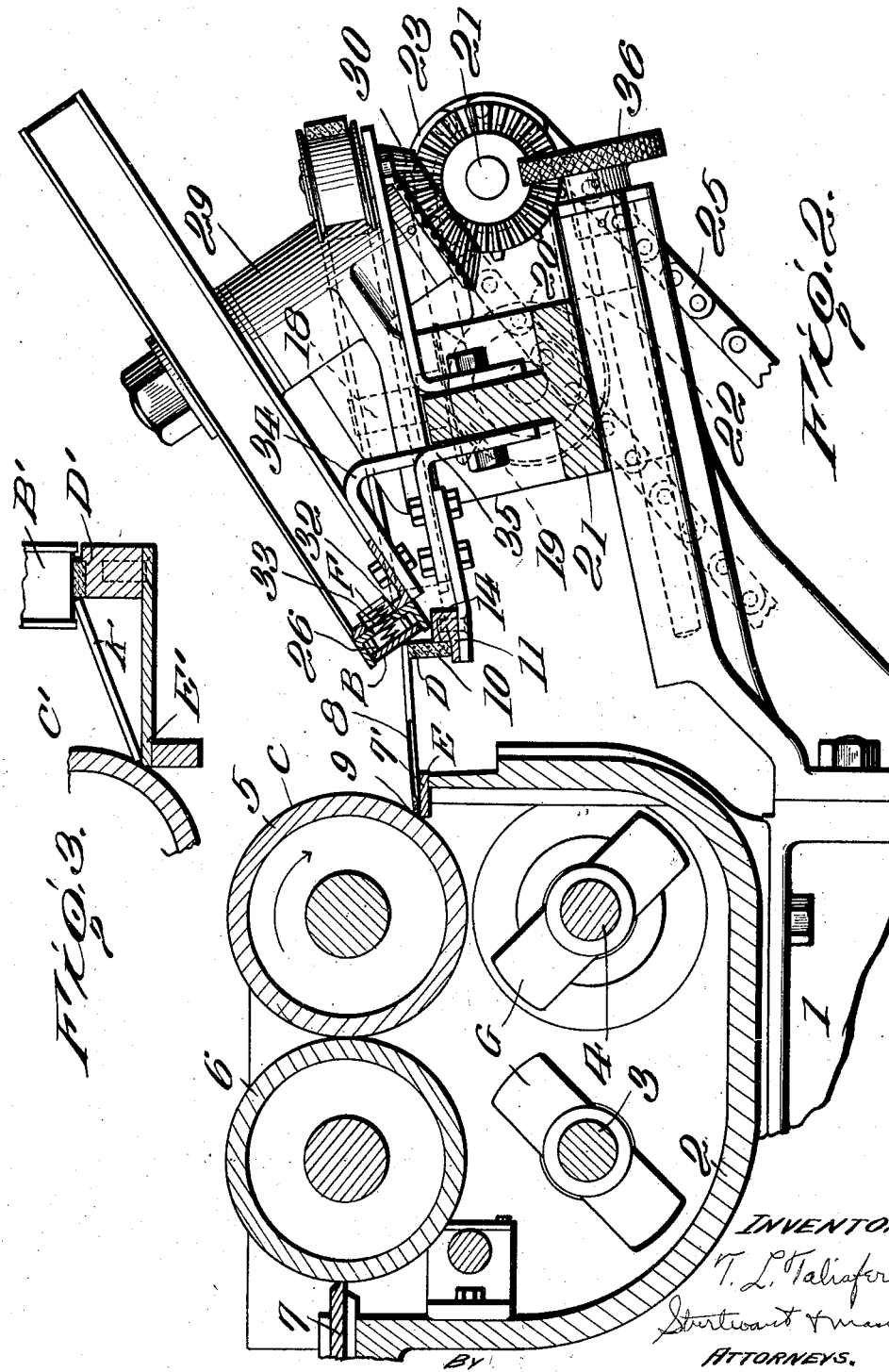
INVENTOR
T. L. Taliaferro
Sturtevant + Mason
ATTORNEYS.

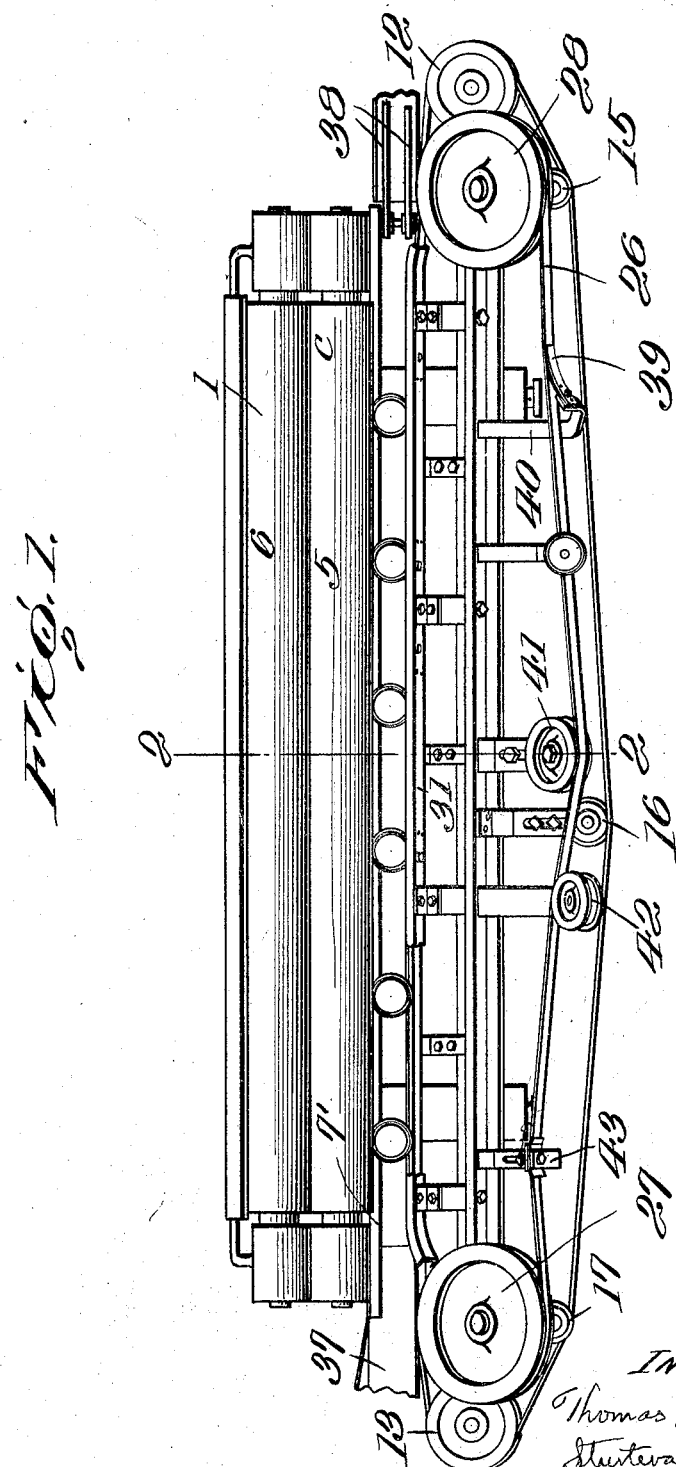

Patented May 10, 1927.

1,628,008

UNITED STATES PATENT OFFICE.

THOMAS L. TALIAFERRO, OF CHICAGO, ILLINOIS.

APPARATUS FOR FORMING SEALING RINGS ON JAR CLOSURES OR THE LIKE.

Application filed May 7, 1924. Serial No. 711,698.

The invention relates to new and useful improvements in an apparatus for forming a sealing ring on a disk which is adapted to be used in connection with the closing of jars or the like, and more particularly to a disk which has a relatively narrow vertical flange at its periphery extending at an angle to the body portion of the disk.

An object of the invention is to provide a coating apparatus of the above type wherein the disks are rolled along the coating member so that the plastic sealing material is scraped from the member on to the edge portion of the disk, and wherein the disk is rolled by means of traveling devices engaging said disk at separated points so as to insure the holding of the disk in contact with the member carrying the coating material and the positive rotation of the disk along said member.

A further object of the invention is to provide an apparatus of the above type wherein the disk is rolled in part by means of a traveling steel belt and in part by a traveling leather belt, said two belts being so disposed as to press the edge of the disk into contact with the member carrying the coating material so as to insure the scraping of the sealing material on to the disk and the rotation of the disk along said member carrying the coating material.

A still further object of the invention is to provide a machine of the above type with means for oiling the surface of the steel belt and with means for scraping any sealing material accumulating thereon from the belt.

In the drawings—

Fig. 1 is a plan view of an apparatus embodying my improvements;

Fig. 2 is a sectional view on the line 2—2 of Fig. 1; and

Fig. 3 is a detail in section showing a modified form of arrangement of belts for rolling the disk along the member carrying the coating material.

The invention consists broadly in an apparatus having a roll which is provided with a thin, uniform layer of sealing material, and the disks to be coated are rolled along this roll with the edges thereof in contact with the roll so as to scrape the plastic sealing material from the roll on to the disk and thus form a layer of sealing material about the edge portion of the disk. The disk is supported in part by a ledge adjacent the roll and parallel therewith, on which the inner portion of the disk adjacent the roll rests, and in part by a traveling belt located adjacent the outer portion of the disk so that said outer portion rests thereon. The belt engages the disk well out toward the periphery thereof or at the periphery, so that the movement of the belt will cause the disks to roll along the roll with the coating material thereon. Associated with the leather belt is a traveling steel belt, which is adapted to engage the outer surface of the flange on the disk, or the outer edge thereof, and to press said disk against the roll with the coating material thereon, and also against the traveling leather belt. The two traveling belts, therefore, cooperate to cause the disk to roll. Associated with the traveling steel belt is an oiling device for oiling the surface of the steel belt so as to prevent the sealing material from accumulating thereon. Also associated with the traveling steel belt is a scraper which operates to scrape any sealing material adhering thereto therefrom, so that the steel belt is kept clean.

Referring more in detail to the drawings, my improved apparatus includes a supporting frame 1 on which is mounted an elongated tank or receptacle 2 in which the coating material is placed, and the level of the coating material is indicated at the line $x$—$x$ on Fig. 1 of the drawings. Mounted in the tank are two rotating shafts 3 and 4 on each of which are mounted projecting arms or mixers for agitating the plastic sealing material in the receptacle. In the upper portion of the tank or receptacle there is a coating roll 5, which is so positioned that the lower portion thereof runs beneath the surface of the sealing material. Associated with the coating roll 5 is a scraper roll or evener 6 which makes contact with the coating roll 5 and turns in the same direction as said coating roll. The scraper bar 7 cooperates with the roll 6 so as to keep the same clean, wiping all the sealing material therefrom which adheres to the roll as it turns in the sealing material. The roll 6 turning as it does in the same direction as the roll 5, will operate to regulate the thickness of the coating formed on the roll 5 so that said roll 5 will be provided with a thin, uniform coating of the sealing material.

Extending along the length of the tank or receptacle 2 is a steel supporting rail 7'. The disks to be coated have their inner edge portions resting on this steel rail 7'. In Fig. 2 of the drawings, I have shown one of the disks at 8 which is sectioned in part. Said disk is of the usual construction used in closing jars, and has its outer edge bent to form a flange 9, and adjacent this flange the disk is shaped so as to form a recess or pocket for the sealing material which is to be applied thereto. The outer edge of the disk rests on the traveling leather belt 10 which moves along the supporting ledge 11. The disk resting on this traveling belt is held at such an angle to the coating roll 5 as to scrape the sealing material from the roll on to the disk and into the recess or pocket for the sealing material. The belt 10 which is preferably formed of leather or the like, passes about rollers 12 and 13 at the opposite ends of the apparatus. One strand of the belt passes along the ledge 11 and just behind the shoulder 14 formed therealong which causes said strand to travel in a fixed path. The other strand of the leather belt runs over rollers 15, 16, and 17. The roller 16 is adjustably mounted so that tension on the belt may be varied. One of the rollers 12 is provided with a short shaft 18 which carries a bevel gear 19 adapted to mesh with a bevel gear 20 carried by a short shaft mounted in a bracket 21 which in turn is adjustably mounted on the frame 1. This short shaft carrying the bevel gear 20 is driven by a sprocket chain 22 from a sprocket wheel 23 on a shaft 24, and the shaft 24 is in turn driven by a sprocket chain 25 from the main operating shaft for the apparatus. It will be understood that the leather belt travels the full length of the apparatus and is adapted to take disks one after another for the coating of the same.

Associated with the traveling leather belt is a steel belt 26. This steel belt 26 runs over rollers 27 and 28 at the opposite ends of the machine. One of said rollers is mounted on a shaft located in a journal bearing 29 and carrying at its lower end a bevel gear 30 which meshes with a bevel gear on the shaft 24 so that as the shaft 24 rotates, it will not only turn the steel belt, but will also turn the leather belt. The steel belt travels along the side of the tank or receptacle for the coating material and at a slight distance therefrom so as to engage the outer edges of the disk to be coated. This steel belt passes through a guiding channel member 31 in which is located a steel backing plate 32 which is forced by means of springs 33 yieldingly in an outward direction, and thus it is that the strand of the steel belt traveling through the channel member 31 will be yieldingly pressed against the edges of the disk. As shown in Fig. 2 of the drawings, this steel belt is so positioned as to engage the extreme outer edge of the flange of the disk, and is at an angle thereto so that it presses the disk downwardly into contact with the leather belt 10 as well as edgewise into contact with the coating roll 5. The channel member 31 is mounted on brackets 34. These brackets are carried by the main bracket 21 which is capable of being shifted toward and from the tank containing the sealing material. It will also be noted that the ledge 11 along which the leather belt passes is carried by brackets 35 which are in turn mounted on the main bracket 21. By turning the hand wheels 36, 36, the main bracket 21 may be shifted toward or from the tank, and thus the machine set for coating disks of different diameters. The disks are fed to the machine through a chute 37. As the disks slide down said chute, they will pass at one side thereof on to the steel rail 7' and at the other side thereof on to the traveling leather belt 10. The traveling leather belt will carry the disk to a point where it will be brought into contact with the traveling steel belt 26, and the two belts will cause these disks to roll along the coating roll from one end thereof to the other.

It will be noted from the details of the drawings in Fig. 2, that the disk is bottom side up with the flange thereof so positioned as to scrape the sealing material from the coating roll. The two traveling belts insure that the disk will rotate and not stand still. As has already been noted, the apparatus is especially adapted for coating a disk with a relatively narrow flange. I am aware that it has been customary to rotate a can end along a coating device by a traveling belt as illustrated in my prior Patent No. 1,299,259, granted April 1, 1919. A single traveling belt, however, does not make sufficient contact with the flange of the disk to rotate the same and cause the disk to scrape the sealing material from the coating roll. In order to increase the pressure of the disk against the roll and to insure that the disk will rotate and thus travel along the roll, I have provided the two belts which are arranged so as to engage a disk at separated points as shown in Fig. 2. The steel belt engages the disk at the extreme outer edge of the flange, while the leather belt engages the disk at a point beneath or inside of the flange. In Fig. 3 of the drawings, I have shown a modified arrangement of the belts, and in this figure the belt 10 is so disposed as to engage the corner of the disk where the flange joins the top portion, and the steel belt engages the extreme outer edge of the flange. The two traveling surfaces, however, in this form of the invention, are at an angle to each other and the edge of the disk sets in the angle, and this insures a firm grip of the belts on the disks.

The same is true of Fig. 2. The two traveling belts set at an angle to each other, and the disk fits in the angle portion of the two belts and is thus gripped and positively fed along. In both instances, the steel belt running as it does along the steel plate backed up by springs, has a yielding bearing against the disk, and therefore, forces said disk in a yielding pressure against the coating roll and also against the belt 10. This is true in both the construction shown in Figs. 2 and 3. The disks to be coated are rolled along one after another in contact with the coating roll, and are then delivered on to belts 38, 38 which convey the disks in a horizontal position away from the machine.

The steel belt 26 in its path of return travel passes along a scraper 39 carried by a bracket 40 mounted on the main bracket 21. The purpose of this scraper is to remove any portions of coating material which may cling or adhere to the steel belt. Said steel belt after passing the scraper, passes beneath an oil cup 40' where a drop of oil is placed on the belt for oiling the surface thereof. Said belt passes over idlers 41 and 42, one of which is adjustable for taking up all unnecessary slack in the belt. Said belt also passes underneath a wiper 43 which distributes the oil over the surface of the belt and wipes off the surplus oil, so that the belt has only an oily surface.

From the above it will be apparent that I have provided a coating apparatus wherein disks for closing jars or the like may be coated one after another in succession, so that said disks may be fed directly into said coating apparatus where they are coated and thence conveyed to a proper drying apparatus for drying the coating material. As soon as the disks reach the coating roll which is supplied with a uniform layer of sealing material, it is rotated through the aid of the traveling leather belt and the traveling steel belt. These two belts cooperate to insure that the disk will be moved edgewise with sufficient force to cause the sealing material to be scraped thereon from the coating roll, and said traveling belts also support the outer edge of the disk and move the same so as to roll the disk along the coating roll.

While I have referred to one of the belts as a leather belt, it will be understood, of course, that other types of belts may be used; but I prefer to use a belt having the qualities of leather as distinguished from a steel belt, so that said belt may cause the disk to roll by frictional contact therewith. While I have described the cooperating belt as a steel belt, it will be understood that other types of belts may be used, but I prefer a steel belt for the reason that it is so positioned that some of the sealing material is pretty likely to come in contact therewith. The steel belt with its surface oiled takes up very little of the sealing material, and what little is taken up may be readily scraped therefrom.

It will be obvious that minor changes in the details of construction and the arrangement of the parts may be made without departing from the spirit of the invention as set forth in the appended claims.

Having thus described the invention, what I claim as new and desire to secure by Letters Patent, is—

1. An apparatus for applying a plastic sealing material to disks for covering jars or the like, comprising a rotating member, means for supplying the surface of said member with a thin uniform layer of sealing material, means for supporting the disks so that said disks may be rolled along said member one after another with the edges thereof positioned to scrape the sealing material from the rotating member on to the disks, and means for rolling the disks along the member including two cooperating traveling devices one of which is arranged to engage the side face of the disk and the other to engage the edge of the disk.

2. An apparatus for applying a plastic sealing material to disks for covering jars or the like, comprising a rotating member, means for supplying the surface of said member with a thin uniform layer of sealing material, means for supporting the disks so that said disks may be rolled along said member one after another with the edges thereof positioned to scrape the sealing material from the rotating member on to the disks, and means for rolling the disks along the rotating member including two cooperating traveling belts one of which is arranged to engage the side face of the disk and the other to engage the edge of the disk.

3. An apparatus for applying a plastic sealing material to disks for covering jars or the like, comprising a rotating member, means for supplying the surface of said member with a thin uniform layer of sealing material, means for supporting the disks so that said disks may be rolled along said member one after another with the edges thereof positioned to scrape the sealing material from the rotating member on to the disks, and means for rolling the disks along the member including two cooperating traveling belts arranged in different planes so as to engage the disks at the side face and edge thereof respectively.

4. An apparatus for applying a plastic sealing material to disks for covering jars or the like, comprising a rotating member, means for supplying the surface of said member with a thin uniform layer of sealing material, means for supporting the disks so that said disks may be rolled along said member one after another with the edges thereof positioned to scrape the sealing material from the rotating member on to the disks, a traveling belt adapted to support and roll the disks along said rotating member, and a second traveling belt adapted to engage the edge of each disk for pressing the same edgewise into contact with said rotating member and for rotating the disk.

5. An apparatus for applying a plastic sealing material to disks for covering jars or the like, comprising an elongated rotating coating roll, means for supplying the surface of the roll with a thin uniform layer of sealing material, means adjacent the surface of the roll for supporting the disks so that said disks may be rolled along the roll one after another with the edges thereof positioned to scrape the sealing material from the rotating member on to the disks, and means located a distance from the roll for supporting the outer portions of the disks and for pressing said disks edgewise into engagement with the coating roll, said means traveling lengthwise of the coating roll so as to roll the disks along the same.

6. An apparatus for applying a plastic sealing material to disks for covering jars or the like, comprising a rotating coating roll, means for supplying the surface thereof with a thin uniform layer of sealing material, a bar extending lengthwise of the roll and adjacent the surface thereof for supporting the inner edge of the disk to be coated, a ledge parallel with said bar and adapted to underlie the outer edge portion of the disk while the same is rolling along the coating roll, a belt supported by said ledge and moving lengthwise of the roll for rotating the disk, and a second traveling belt for engaging the edge of the disk for aiding in holding the disk in contact with the coating roll and for rolling the same along said roll.

7. An apparatus for applying a plastic sealing material to disks for covering jars or the like, comprising a rotating coating roll, means for supplying the surface thereof with a thin uniform layer of sealing material, a steel bar extending lengthwise of the coating roll and adjacent the surface thereof for supporting the inner edge portion of the disk as it rolls along the coating roll, a ledge parallel with said steel bar and underlying the outer portion of the disk, a traveling leather belt supported by said ledge on which the disk rests, and a traveling steel belt cooperating with the leather belt for holding the disk in contact with the coating roll and rolling the same along said coating roll.

8. An apparatus for applying a plastic sealing material to disks for covering jars or the like, comprising a rotating coating roll, means for supplying the surface of said rotating roll with a thin uniform layer of sealing material, means for supporting and holding the inner edge of a disk in contact with the coating roll whereby the sealing material is scraped by the disk from the roll on to the edge portion of the disk, and cooperating belts traveling in planes arranged at an angle to each other for engaging the outer portion of the disk for pressing said disk edgewise into contact with the coating roll and for rolling said disk along said roll.

9. An apparatus for applying a plastic sealing material to disks for covering jars or the like, comprising a rotating coating roll, means for supplying the surface of said rotating roll with a thin uniform layer of sealing material, means for supporting and holding the inner edge of a disk in contact with the coating roll whereby the sealing material is scraped by the disk from the roll on to the edge portion of the disk, and cooperating belts traveling in planes arranged at an angle to each other for engaging the outer portion of the disk for pressing said disk edgewise into contact with the coating roll and for rolling said disk along said roll, said belts being disposed so that one of the belts serves as a traveling support for the outer edge portion of the disk and the other belt being so disposed as to press said disk edgewise into contact with the coating roll and for rolling said disk along said roll.

10. An apparatus for applying a plastic sealing material to disks for covering jars or the like, comprising a rotating coating roll, means for supplying the surface of said rotating roll with a thin uniform layer of sealing material, means for supporting and holding the inner edge of a disk in contact with the coating roll whereby the sealing material is scraped by the disk from the roll on to the edge portion of the disk, cooperating belts traveling in planes arranged at an angle to each other for engaging the outer portion of the disk for pressing said disk edgewise into contact with the coating roll and for rolling said disk along said roll, said belts being disposed so that one of the belts serves as a traveling support for the outer edge portions of the disk and the other belt being so disposed as to press said disk edgewise into contact with the coating roll and for rolling said disk along said roll, and means for yieldingly backing up said last-named belt whereby said disk is yieldingly pressed into contact with the coating roll.

11. An apparatus for applying a plastic sealing material to disks for covering jars or the like, comprising a rotating coating roll, means for supplying the surface of said rotating roll with a thin uniform layer of sealing material, means for supporting and holding the inner edge of a disk in contact with the coating roll whereby the sealing material is scraped by the disk from the roll on to the edge portion of the disk, cooperating belts traveling in planes arranged at an angle to each other for engaging the outer portion of the disk for pressing said disk edgewise into contact with the coating roll and for rolling said disk along said roll, and means for supporting said belts whereby they may be adjusted toward and from the coating roll for different sized disks.

12. An apparatus for applying a plastic sealing material to disks for covering jars or the like, comprising a rotating coating roll, means for supplying the surface of said rotating roll with a thin uniform layer of sealing material, means for supporting and holding the inner edge of a disk in contact with the coating roll whereby the sealing material is scraped by the disk from the roll on to the edge portion of the disk, cooperating belts traveling in planes arranged at an angle to each other for engaging the outer portion of the disk for pressing said disk edgewise into contact with the coating roll and for rolling said disk along said roll, said belts being disposed so that one of the belts serves as a traveling support for the outer edge portion of the disk and the other belt being so disposed as to press said disk edgewise into contact with the coating roll and for rolling said disk along said roll, means for yieldingly backing up said last-named belt whereby said disk is yieldingly pressed into contact with the coating roll, and means for supporting said belts whereby they may be adjusted toward and from the coating roll to accommodate different sized disks.

13. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling belt, and means for yieldingly supporting and pressing the belt against the outer edge portion of the disk.

14. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a yieldingly mounted guiding plate parallel with said roll, and a belt traveling along the inner face of said plate and adapted to bear against the outer edge portion of the disk for yieldingly pressing the disk into contact with the coating roll and for rolling said disk along said roll.

15. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling belt, means for yieldingly supporting and pressing the belt against the outer edge portion of the disk, and a traveling steel belt disposed so as to engage the outer edge portion of the disk for pressing the same against the coating roll and for rolling the same along said roll.

16. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling belt, means for yieldingly supporting and pressing the belt against the outer edge portion of the disk, a traveling steel belt disposed so as to engage the outer edge portion of the disk for pressing the same against the coating roll and for rolling the same along said roll, and an oiling device located in the path of travel of the steel belt for applying a thin film of oil thereto.

17. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling belt, means for yieldingly supporting and pressing the belt against the outer edge portion of the disk, a traveling steel belt disposed so as to engage the outer edge portion of the disk for pressing the same against the coating roll and for rolling the same along said roll, an oiling device located in the path of travel of the steel belt for applying a thin film of oil thereto, and a pad beneath which the belt travels for distributing the oil and wiping off the surplus oil.

18. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling belt, means for yieldingly supporting and pressing the belt against the outer edge portion of the disk, a traveling steel belt disposed so as to engage the outer edge portion of the disk for pressing the same against the coating roll and for rolling the same along said roll, an oiling device located in the path of travel of the steel belt for applying a thin film of oil thereto, and a scraper for engaging the belt for scraping therefrom any sealing material adhering to the belt.

19. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling belt, means for yieldingly supporting and pressing the belt against the outer edge portion of the disk, a traveling steel belt disposed so as to engage the outer edge portion of the disk for pressing the same against the coating roll and for rolling the same along said roll, an oiling device located in the path of travel of the steel belt for applying a thin film of oil thereto, a pad beneath which the belt travels for distributing the oil and wiping off the surplus oil, and a scraper located in the path of travel of the belt for scraping off any sealing material adhering thereto.

20. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling steel belt, a guiding channel parallel with the coating roll along which the steel belt travels, and a spring plate in said guiding channel for backing up the steel belt and for yieldingly pressing the belt into contact with the disk, and the disk edgewise into contact with the coating roll.

21. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling steel belt, a guiding channel parallel with the coating roll along which the steel belt travels, a spring plate in said guiding channel for backing up the steel belt and for yieldingly pressing the belt into contact with the disk and the disk edgewise into contact with the coating roll, and an oiling device located in the path of travel of the steel belt for applying a thin film of oil thereto.

22. An apparatus for applying a plastic sealing material to disks for covering jars or the like, comprising a rotating coating roll, means for supplying the edges thereof with a thin uniform layer of sealing material, means for holding the disks in contact with the coating roll and for rotating the same along said roll including a traveling steel belt, a guiding channel parallel with the coating roll along which the steel belt travels, a spring plate in said guiding channel for backing up the steel belt and for yieldingly pressing the belt into contact with the disk and the disk edgewise into contact with the coating roll, an oiling device located in the path of travel of the steel belt for applying a thin film of oil thereto, and a scraper located in the path of travel of the steel belt for scraping from said belt any sealing material adhering thereto.

In testimony whereof, I affix my signature.

THOMAS L. TALIAFERRO.